United States Patent
Friend et al.

(10) Patent No.: US 10,870,542 B1
(45) Date of Patent: Dec. 22, 2020

(54) MANUALLY-INITIATED SYNCHRONIZATION APPARATUSES FOR CONNECTING INDEPENDENTLY-DRIVEN PLATFORMS TO CONVEYING PLATFORMS FOR MOVEMENT THEREWITH

(71) Applicant: Toyota Motor Engineering & Manufacturing North America, Inc., Plano, TX (US)

(72) Inventors: Ronald Scott Friend, Jeffersonville, KY (US); Brian McElroy, Winchester, KY (US); Robert Aaron Allex, Ewing, KY (US)

(73) Assignees: Toyota Motor Engineering & Manufacturing, Plano, TX (US); North America, Inc., Plano, TX (US)

( * ) Notice: Subject to any disclaimer, the term of this patent is extended or adjusted under 35 U.S.C. 154(b) by 0 days.

(21) Appl. No.: 16/670,171

(22) Filed: Oct. 31, 2019

(51) Int. Cl.
| | |
|---|---|
| *B65G 47/24* | (2006.01) |
| *B62D 65/18* | (2006.01) |
| *B65G 17/42* | (2006.01) |
| *B65G 35/06* | (2006.01) |

(52) U.S. Cl.
CPC ............. *B65G 47/24* (2013.01); *B62D 65/18* (2013.01); *B65G 17/42* (2013.01); *B65G 35/06* (2013.01)

(58) Field of Classification Search
CPC ........ B65G 47/24; B65G 17/42; B65G 17/44; B65G 35/06; B61B 10/025; B61B 10/04
See application file for complete search history.

(56) References Cited

U.S. PATENT DOCUMENTS

| | | | | |
|---|---|---|---|---|
| 3,566,802 | A | * | 3/1971 | Lundgvist ............... A47B 53/02 104/172.3 |
| 5,398,802 | A | * | 3/1995 | Clopton ............... B23Q 7/1452 198/343.2 |
| 7,306,089 | B2 | | 12/2007 | Ellens |
| 9,533,830 | B2 | * | 1/2017 | Lingenhoel ............ B65G 17/34 |
| 10,232,899 | B1 | | 3/2019 | Gatta et al. |

FOREIGN PATENT DOCUMENTS

| | | |
|---|---|---|
| JP | 3653162 B2 | 5/2005 |
| KR | 100911390 B1 | 8/2009 |
| WO | 2019020837 A1 | 1/2019 |

* cited by examiner

*Primary Examiner* — William R Harp
(74) *Attorney, Agent, or Firm* — Dinsmore & Shohl LLP

(57) ABSTRACT

An independently-driven platform used in vehicle assembly includes a side frame and a manually-initiated synchronizing apparatus mounted to the side frame. The manually-initiated synchronizing apparatus includes a linear actuator including a cylinder portion mounted to the side frame and a rod portion that extends and retracts from the cylinder portion. A conveying platform engagement member has a front that faces a conveying direction when synchronizing with a synchronization tab of a conveying platform, a rear that faces an upstream direction and a top connected to the rod portion of the manually-initiated synchronizing apparatus. The conveying platform engagement member has a notch in the rear that is configured to engage the synchronization tab.

13 Claims, 3 Drawing Sheets

US 10,870,542 B1

MANUALLY-INITIATED SYNCHRONIZATION APPARATUSES FOR CONNECTING INDEPENDENTLY-DRIVEN PLATFORMS TO CONVEYING PLATFORMS FOR MOVEMENT THEREWITH

TECHNICAL FIELD

The present specification generally relates to synchronization apparatuses and associated methods, and more specifically, manually-initiated synchronization apparatuses for connecting independently-driven platforms to conveying platforms for movement therewith along a conveyor.

BACKGROUND

Skillet conveyors are formed of large, moving conveying platforms that support both a vehicle and a manufacturing team performing assembly operations. The skillets are the conveying platforms that are arranged to create an effect of a moving floor.

Currently, an automatic synchronizing device is used to connect independently-driven platforms to a particular conveying platform for movement therewith, sometimes referred to a syncing. These automatic synchronizing devices automatically connect or sync based on a predetermined condition and do not allow an operator to select when the independently driven platforms are connected to the conveying platforms. Work on the vehicle may be impeded until the independently driven platform is automatically synchronized to the skillet as the equipment may be unusable until the synchronization occurs.

SUMMARY

In one embodiment, an independently-driven platform used in vehicle assembly includes a side frame and a manually-initiated synchronizing apparatus mounted to the side frame. The manually-initiated synchronizing apparatus includes a linear actuator including a cylinder portion mounted to the side frame and a rod portion that extends and retracts from the cylinder portion. A conveying platform engagement member has a front that faces a conveying direction when synchronizing with a synchronization tab of a conveying platform, a rear that faces an upstream direction and a top connected to the rod portion of the manually-initiated synchronizing apparatus. The conveying platform engagement member has a notch in the rear that is configured to engage the synchronization tab.

In another embodiment, a method of synchronizing an independently-driven platform with a conveying platform of a conveyor is provided. The method includes manually actuating a control mechanism thereby lowering a conveying platform engagement member from a disengaged position to an engaged position using a linear actuator. The conveying platform engagement member has a front that faces a conveying direction, a rear that faces an upstream direction and a top that is connected to the linear actuator. The front of the conveying platform engagement member includes an angled portion that is oblique to horizontal. With the conveying platform engagement member in the engaged position, the angled portion of the front is slid over a synchronization tab of the conveying platform. A leading edge of the synchronization tab engages with the rear of the conveying platform engagement member such that the independently-driven platform moves with the conveying platform in the conveying direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present description is generally directed to a manually-initiated synchronizing apparatus that is used to connect independently-driven platforms (e.g., a dolly, equipment, etc.) to a particular conveying platform for movement therewith. The manually-initiated synchronizing apparatus includes a linear actuator that attaches or is attached to a side frame of the independently-driven platform. The manually-initiated synchronizing apparatus includes a conveying platform attachment member that includes an angled front for sliding over a synchronization tab and an engagement notch on a rear of the conveying platform attachment member that provides clearance for the conveying platform attachment member to slide back over the synchronization tab and engage therewith.

Figure 1:
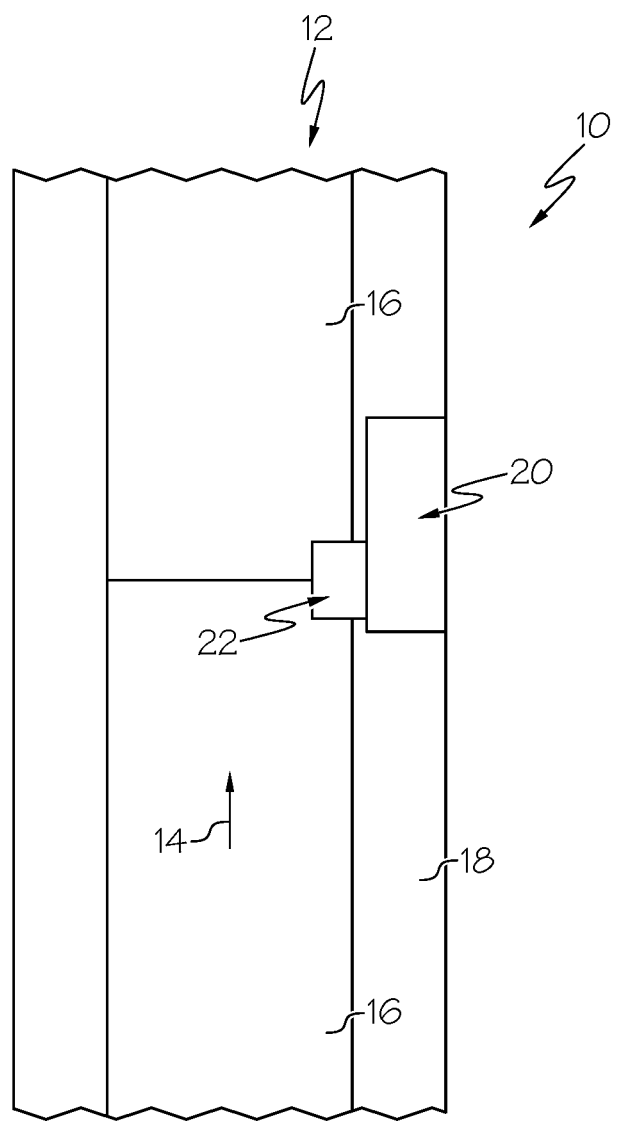
FIG. 1 is a diagrammatic plan view of an assembly line system for use in assembling vehicles, according to one or more embodiments shown and described herein.

Referring to FIG. 1, an assembly line system 10 generally includes a conveyor (denoted by element 12) that is used to convey a vehicle body in a conveying direction 14 for assembling various components to the vehicle body. The conveyor 12 may include a plurality of conveying platforms 16, commonly referred to as skillets, that are used to support the vehicle bodies with area of the conveying platforms 16 remaining available to allow user to move about the vehicle body for various assembly operations. In some embodiments, the conveying platforms 16 may have vehicle support devices, such as lifts, columns, etc. located thereon for supporting and/or repositioning the vehicle body (e.g., lifting and lowering) as the vehicle body travels in the conveying direction. A fixed track 18 is located alongside the conveying platforms 16. The fixed track 18 allows users and equipment to travel alongside and relative to the conveying platforms 16.

An issue with conveyors 12 is that they may be driven by drive systems at a somewhat constant speed in the conveying direction 14. In this regard, the conveying platforms 16 that carry the vehicle bodies may also be driven by at this constant speed. However, some assembly operations may be more time-consuming than others. Independently-driven platforms 20 may be provided that can sync with the conveying platforms 16 and travel therewith at the same speed. The independently-driven platforms 20 may include equipment for performing one or more assembly operations. To this end, the independently-driven platforms 20 include a manually-initiated synchronizing apparatus 22 that is used to connect the independently-driven platforms 20 to a particular conveying platform 16 for movement therewith. The manually-initiated synchronizing apparatus 22 includes a conveying platform engagement member 26 that connects to a synchronization tab 30 (FIG. 2) of the conveying platform 16.

Figure 2:
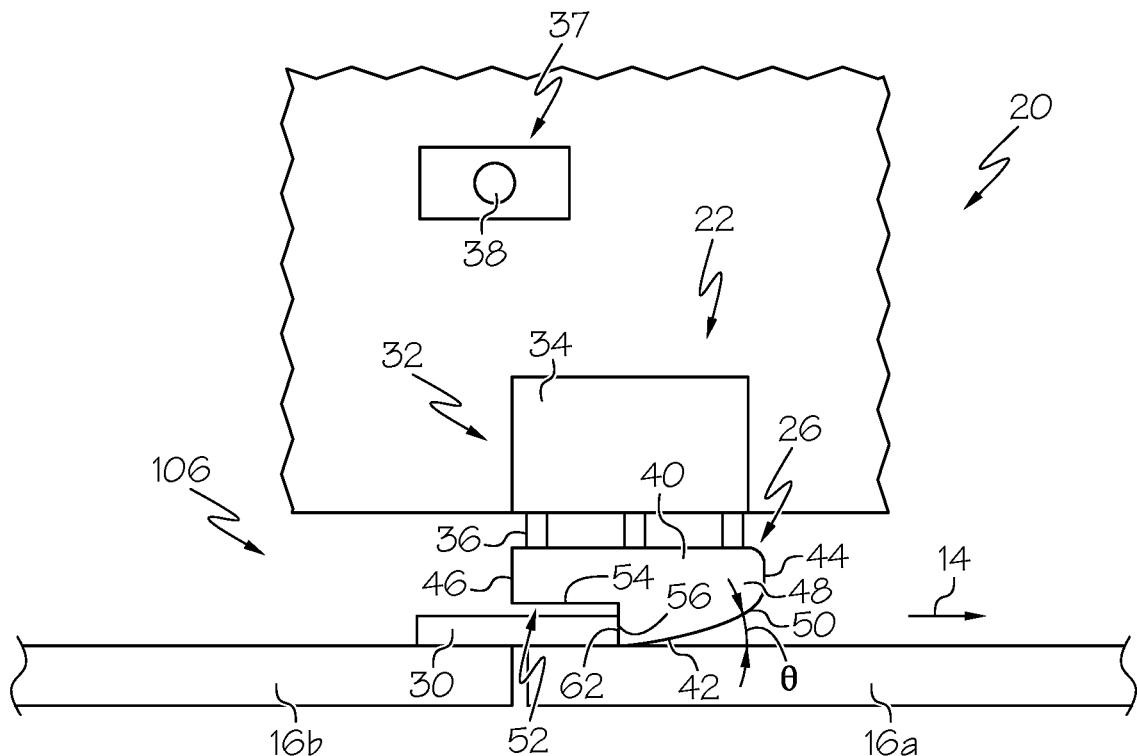
FIG. 2 is a diagrammatic side view of a manually-initiated synchronizing apparatus for use with an independently-driven platform, according to one or more embodiments shown and described herein.

Referring to FIG. 2, the manually-initiated synchronizing apparatus 22 is illustrated diagrammatically engaged with or synced to the synchronization tab 30 of conveying platform 16a, 16b. The manually-initiated synchronizing apparatus 22 includes a linear actuator 32 (e.g., commercially available from SMC Corporation of Tokyo, Japan) that includes a cylinder portion 34 and a rod portion 36 that is connected to the conveying platform engagement member 26 for moving the conveying platform engagement member 26 up and down between an engaged position and a disengaged position relative to the synchronization tab 30. The linear actuator may be, for example, pneumatically driven. A user input 37 may include a control mechanism 38 (e.g., a button, switch, etc.) that can be used to control operation of the linear actuator 32.

The conveying platform engagement member 26 includes a top 40 that is connected to the rod portion 36 of the linear actuator 32, a bottom 42 that faces the conveying platform 16a, 16b, a front 44 that faces toward the conveying direction 14, a rear 46 that faces in an upstream direction and sides 48 that face in a cross-conveying direction. The front 44 may include an angled portion 50 that is provided at an oblique angle θ (e.g., about 22.5 degrees) to horizontal. Providing the front 44 with the angled portion 50 can facilitate sliding of the conveying platform engagement member 26 over the synchronization tab 30 with the synchronization tab 30 in the engaged position. The conveying platform engagement member 26 further includes an engagement notch 52 that is located at the rear 46. The engagement notch 52 provides clearance for the conveying platform engagement member 26 to slide over the synchronization tab 30 when engaging therewith.

The synchronization tab 30 may provide a connection between the adjacent conveying platforms 16a and 16b. The synchronization tab 30 may have a relatively low profile, such as a height of about five millimeters with a width of about 50 mm and a length of about 50 mm. The height of the engagement notch 52 may be greater than five millimeters to facilitate sliding of a horizontal surface 54 of the engagement notch 52 over a top of the synchronization tab 30 until a vertical engagement surface 56 engages the synchronization tab 30, which causes the conveying platform engagement member 26 to ride along with the synchronization tab 30. The conveying platform engagement member 26 may be formed of any material suitable for engaging the synchronization tab 30, such as steel or other metal material.

Figure 3:
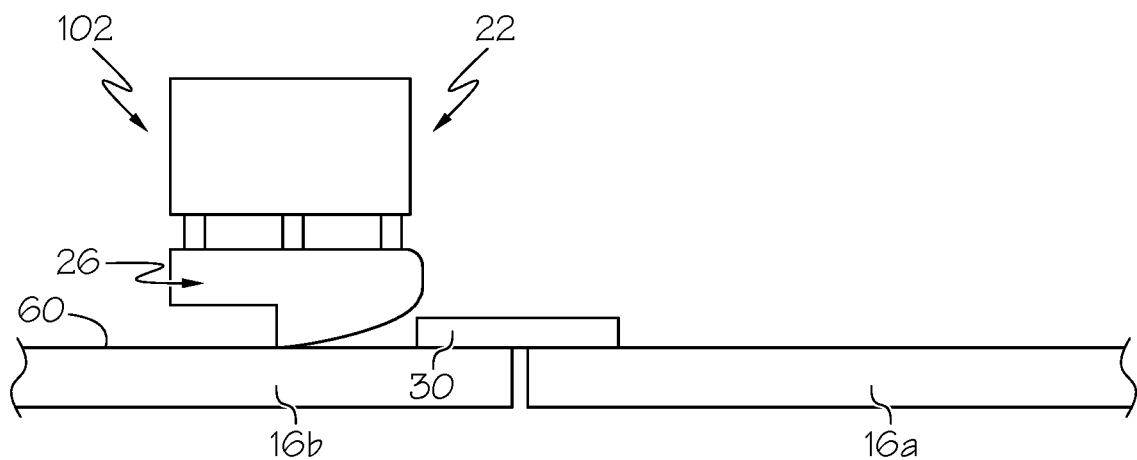
FIG. 3 is a side view of the manually-initiated synchronizing apparatus of FIG. 2 in isolation, according to one or more embodiments shown and described herein.
Figure 4:
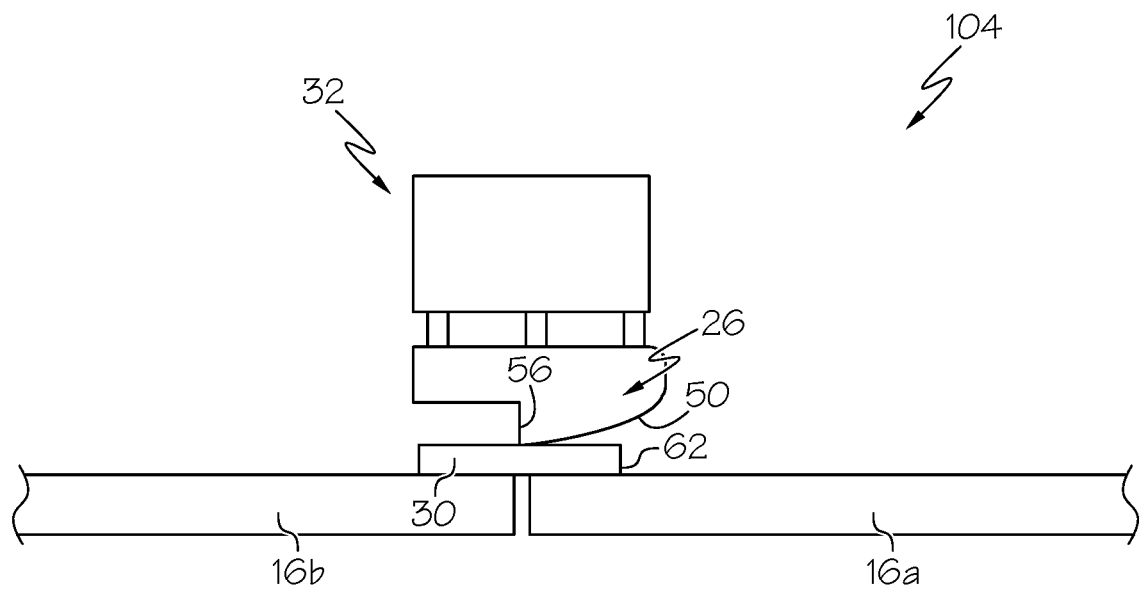
FIG. 4 is another side view of the manually-initiated synchronizing apparatus of FIG. 2 in isolation, according to one or more embodiments shown and described herein.
Figure 5:
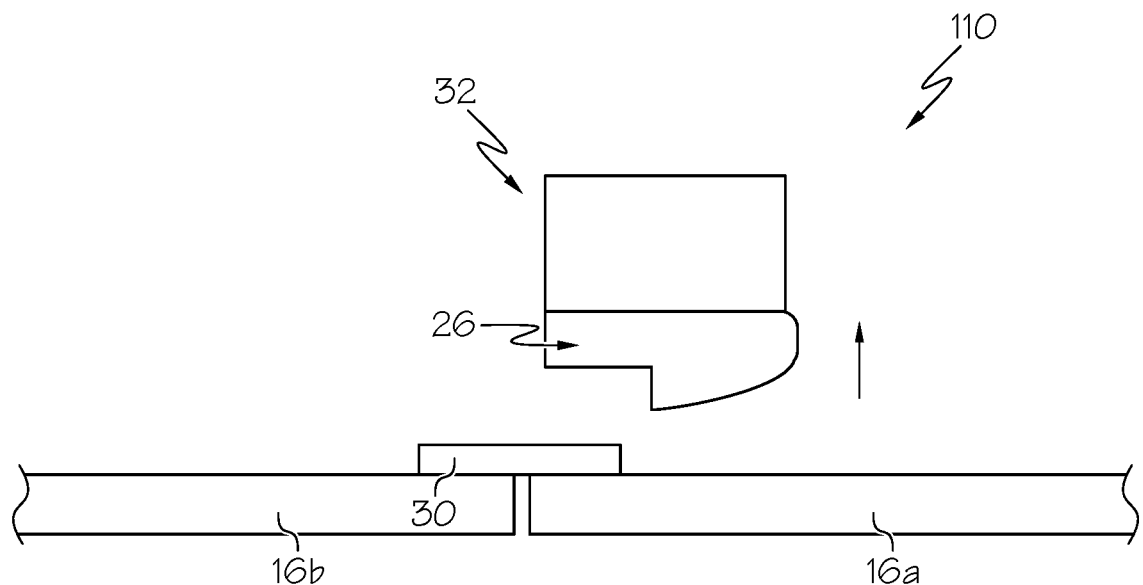
FIG. 5 is another side view of the manually-initiated synchronizing apparatus of FIG. 2 in isolation, according to one or more embodiments shown and described herein.

FIGS. 2-5 illustrate a method of operating the manually-initiated synchronizing apparatus 22 to connect or sync to a conveying platform 16. Referring first to FIG. 3, a user actuates the control mechanism 38 (FIG. 2), which causes the lowering of the conveying platform engagement member 26 from the disengaged configuration to the engaged configuration at step 102. The conveying platform engagement member 26 may or may not then engage an upper surface 60 of the conveying platform 16 and slide there along as the conveying platform engagement member 26 is moved (e.g., manually, motor-driven, etc.) toward the synchronization tab 30. Referring to FIG. 4, the angle θ of the angled portion 50 allows the conveying platform engagement member 26 to climb upon the synchronization tab 30 at step 104. The linear actuator 32 has sufficient pressure to allow some retraction of the conveying platform engagement member 26, while biasing the conveying platform engagement member 26 toward the engaged configuration.

Referring still to FIG. 4, the conveying platform engagement member 26 rides over the synchronization tab 30 until the vertical engagement surface 56 reaches a leading edge 62 of the synchronization tab 30. At this point, referring again to FIG. 2, the linear actuator 32 causes the conveying platform engagement member 26 to lower to the engaged configuration at step 106. The leading edge 62 of the synchronization tab 30 may then engage the vertical engagement surface 56, which syncs the independently-driven platform 20 to the conveying platform 16.

Referring now to FIG. 5, the user may again actuate the control mechanism 38 (FIG. 2), which can cause the conveying platform engagement member 26 to raise to the disengaged configuration at step 110. In the disengaged configuration, the vertical engagement surface 56 may be raised completely above the leading edge 62 of the synchronization tab 30. The independently-driven platform 20 may then be moved away from the conveying platform 16 to engage another conveying platform 16.

The above-described independently-driven platforms include manually-initiated synchronization apparatuses that allow for user-initiated syncing between the independently-driven platforms and the conveying platforms. The independently-driven platforms may be manually driven or motor driven, as examples. The independently-driven platforms may include equipment that is used to perform one or more assembly operations on a vehicle body. By allowing for manual syncing between the independently-driven platforms and conveying platforms, one or more assembly operations may be performed before the independently-driven platforms are synced to the conveying platforms using the manually-initiated synchronizing apparatuses.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An independently-driven platform used in vehicle assembly, comprising:
   a side frame;
   a manually-initiated synchronizing apparatus mounted to the side frame, the manually-initiated synchronizing apparatus comprising a linear actuator comprising a cylinder portion mounted to the side frame and a rod portion that extends and retracts from the cylinder portion; and a conveying platform engagement member having a front that faces a conveying direction when synchronizing with a synchronization tab of a conveying platform, a rear that faces an upstream direction and a top connected to the rod portion of the manually-initiated synchronizing apparatus, the conveying platform engagement member having a notch in the rear configured to engage the synchronization tab.

2. The independently-driven platform of claim 1 further comprising a user input comprising a control mechanism, wherein user actuation of the control mechanism extends and retracts the rod portion relative to the cylinder portion.

3. The independently-driven platform of claim 1, wherein the front of the conveying platform engagement member includes an angled portion that is oblique to horizontal.

4. The independently-driven platform of claim 1, wherein the notch includes a vertical engagement surface and a horizontal engagement surface, the vertical engagement surface arranged and configured to engage a leading edge of the synchronization tab in an engaged configuration.

5. The independently-driven platform of claim 4, wherein the vertical engagement surface extends vertically a distance of at least about five millimeters.

6. The independently-driven platform of claim 1, wherein the linear actuator comprises a pneumatic cylinder.

7. A method of synchronizing an independently-driven platform with a conveying platform of a conveyor, the method comprising:

manually actuating a control mechanism thereby lowering a conveying platform engagement member from a disengaged position to an engaged position using a linear actuator, the conveying platform engagement member having a front that faces a conveying direction, a rear that faces an upstream direction and a top that is connected to the linear actuator, the front of the conveying platform engagement member including an angled portion that is oblique to horizontal;

with the conveying platform engagement member in the engaged position, sliding the angled portion of the front over a synchronization tab of the conveying platform; and engaging a leading edge of the synchronization tab with the rear of the conveying platform engagement member such that the independently-driven platform moves with the conveying platform in the conveying direction.

8. The method of claim 7, wherein the conveying platform engagement member has a notch in the rear configured to engage the synchronization tab.

9. The method of claim 8, wherein the notch includes a vertical engagement surface and a horizontal engagement surface, the vertical engagement surface engaging the leading edge of the synchronization tab.

10. The method of claim 9, wherein the vertical engagement surface extends vertically a distance of at least about five millimeters.

11. The method of claim 7 further comprising manually actuating a user input comprising a control mechanism, wherein actuation of the control mechanism extends and retracts a rod portion of the linear actuator relative to a cylinder portion.

12. The method of claim 7, wherein the linear actuator comprises a pneumatic cylinder.

13. The method of claim 7 further comprising manually actuating the control mechanism thereby raising the conveying platform engagement member from the engaged position to the engaged position using the linear actuator thereby disengaging the conveying platform engagement member from the synchronization tab.

\* \* \* \* \*

UNITED STATES PATENT AND TRADEMARK OFFICE
CERTIFICATE OF CORRECTION

PATENT NO. : 10,870,542 B1  
APPLICATION NO. : 16/670171  
DATED : December 22, 2020  
INVENTOR(S) : Friend et al.

It is certified that error appears in the above-identified patent and that said Letters Patent is hereby corrected as shown below:

On the Title Page

Item (73), assignee, delete "Toyota Motor Engineering & Manufacturing, Plano, TX (US); North America, Inc., Plano, TX (US)" and insert --Toyota Motor Engineering & Manufacturing North America, Inc., Plano, TX (US)--, therefor.

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*